(12) United States Patent
Smith et al.

(10) Patent No.: US 9,595,083 B1
(45) Date of Patent: Mar. 14, 2017

(54) METHOD AND APPARATUS FOR IMAGE PRODUCING WITH PREDICTIONS OF FUTURE POSITIONS

(71) Applicant: Lockheed Martin Corporation, Bethesda, MD (US)

(72) Inventors: David Alan Smith, Cary, NC (US); Gregory Anthony Harrison, Oviedo, FL (US)

( * ) Notice: Subject to any disclaimer, the term of this patent is extended or adjusted under 35 U.S.C. 154(b) by 239 days.

(21) Appl. No.: 14/254,172

(22) Filed: Apr. 16, 2014

Related U.S. Application Data

(60) Provisional application No. 61/812,465, filed on Apr. 16, 2013.

(51) Int. Cl.
| | |
|---|---|
| *G06T 15/00* | (2011.01) |
| *G06T 5/00* | (2006.01) |
| *G06T 19/20* | (2011.01) |
| *G06T 19/00* | (2011.01) |
| *G02B 27/01* | (2006.01) |

(52) U.S. Cl.
CPC ............ *G06T 5/006* (2013.01); *G06T 19/006* (2013.01); *G06T 19/20* (2013.01); *G02B 27/0172* (2013.01)

(58) Field of Classification Search
None
See application file for complete search history.

(56) References Cited

U.S. PATENT DOCUMENTS

| | | | |
|---|---|---|---|
| 5,933,125 A * | 8/1999 | Fernie ................. | G02B 27/017 345/619 |
| 5,982,421 A | 11/1999 | Inou et al. | |
| 6,628,282 B1 * | 9/2003 | Hertzmann ............ | G06T 15/20 345/427 |
| 7,460,154 B2 | 12/2008 | Kawahara | |
| 7,932,926 B2 | 4/2011 | Tomita et al. | |
| 8,259,183 B2 | 9/2012 | Tomita et al. | |
| 8,433,185 B2 | 4/2013 | Cheng et al. | |
| 8,520,010 B2 * | 8/2013 | Rubin .................... | A63F 13/10 345/501 |
| 8,611,733 B2 | 12/2013 | Ohishi | |

(Continued)

OTHER PUBLICATIONS

Rong-gui Ma et al., HUD Image Vibration Detection on Improved Edge Detection and Corner Extraction, International Journal of Signal Processing, Imaging Processing and Pattern Recognition, vol. 7, No. 1 (2014) pp. 393-404; http://dx.doi.org/10.14257/ijsip.2014.7.1.36.

*Primary Examiner* — Anh-Tuan V Nguyen
(74) *Attorney, Agent, or Firm* — Oblon, McClelland, Maier & Neustadt, L.L.P.

(57) ABSTRACT

Aspects of the disclosure provide an apparatus for image displaying. The apparatus includes a prediction system and an imaging system. The prediction system is configured to predict, for a first time, a first position of a display device at a specific future time for displaying an image associated with a position of the display, and predict, for a second time that is later than the first time, a second position of the display at the future time with an offset to the first position. The imaging system is configured to render a first image associated with the first position, buffer the first image in a memory, and adjust the buffered first image according to the offset to generate a second image associated with the second position of the display device.

23 Claims, 6 Drawing Sheets

(56) References Cited

U.S. PATENT DOCUMENTS

| | | | | |
|---|---|---|---|---|
| 8,884,968 B2* | 11/2014 | Markovic | | G06T 15/205 |
| | | | | 345/473 |
| 8,970,495 B1* | 3/2015 | Biffle | | G09G 3/003 |
| | | | | 345/158 |
| 2004/0130549 A1* | 7/2004 | Tinker | | G06T 7/0024 |
| | | | | 345/473 |
| 2004/0155968 A1* | 8/2004 | Cheatle | | H04N 7/18 |
| | | | | 348/207.99 |
| 2006/0061660 A1* | 3/2006 | Brackmann | | H04N 5/2253 |
| | | | | 348/208.1 |
| 2006/0146046 A1* | 7/2006 | Longhurst | | G01S 3/7865 |
| | | | | 345/418 |
| 2008/0303912 A1* | 12/2008 | Ahonen | | H04N 5/232 |
| | | | | 348/222.1 |
| 2009/0015591 A1* | 1/2009 | Tanaka | | G09G 5/399 |
| | | | | 345/547 |
| 2010/0026714 A1* | 2/2010 | Utagawa | | G02B 27/017 |
| | | | | 345/633 |
| 2010/0060632 A1* | 3/2010 | Lefevre | | G06T 1/0007 |
| | | | | 345/419 |
| 2010/0079485 A1* | 4/2010 | Bentley | | G06F 1/1626 |
| | | | | 345/619 |
| 2010/0091031 A1* | 4/2010 | Tsujimoto | | G02B 27/017 |
| | | | | 345/589 |
| 2011/0025836 A1* | 2/2011 | Tamaki | | B60R 11/04 |
| | | | | 348/78 |
| 2012/0105473 A1* | 5/2012 | Bar-Zeev | | G02B 27/017 |
| | | | | 345/633 |
| 2012/0293395 A1* | 11/2012 | Williams | | G02B 27/017 |
| | | | | 345/8 |
| 2013/0021483 A1* | 1/2013 | Bennett | | H04N 19/56 |
| | | | | 348/208.4 |
| 2013/0027394 A1* | 1/2013 | Kho | | G06T 15/205 |
| | | | | 345/419 |
| 2013/0163825 A1* | 6/2013 | Shimura | | G06K 9/00335 |
| | | | | 382/107 |
| 2013/0335527 A1* | 12/2013 | Takahashi | | H04N 19/597 |
| | | | | 348/43 |
| 2014/0160170 A1* | 6/2014 | Lyons | | G09G 5/38 |
| | | | | 345/676 |

\* cited by examiner

METHOD AND APPARATUS FOR IMAGE PRODUCING WITH PREDICTIONS OF FUTURE POSITIONS

INCORPORATION BY REFERENCE

This present disclosure claims the benefit of U.S. Provisional Application No. 61/812,465, "Image Vibration Reduction with High-Speed Minimal Distortion Tracking Buffer" filed on Apr. 16, 2013, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Displays that represent the outside world when worn on a user's head may have noticeable latency in keeping up with the user's motion. Also, displays that are worn on the head in an environment with significant noise and vibration can be difficult to view. In particular, high frequency content, such as text may be totally unreadable. This can be a problem with any head wearable device due to the requirement to track the users head position, but particularly so when worn in high noise and vibration environments such as aircraft cockpits. The latency associated with offset measurement and image rendering is simply too high to usefully counteract this issue. Predictive models associated with fixed vibration frequencies can improve the image, but cannot properly account for random noise. Fixing the display relative to the head, using a user specific helmet mounting can also improve the system, but the nature of helmets requires that there be some elasticity between the users head and the helmet so that the helmet can fulfill its primary purpose, protecting the wearer's head. This elasticity also contributes to the noise and vibration and may even introduce additional modes in the vibration that need to be dealt with.

SUMMARY

Aspects of the disclosure provide an apparatus for image displaying. The apparatus includes a prediction system and an imaging system. The prediction system is configured to predict, for a first time, a first position of a display device at a specific future time for displaying an image associated with a position of the display, and predict, for a second time that is later than the first time, a second position of the display at the future time with an offset to the first position. The imaging system is configured to render a first image associated with the first position, buffer the first image in a memory, and adjust the first image according to the offset to generate a second image associated with the second position of the display device.

According to an aspect of the disclosure, a first memory space in the memory is allocated to a first buffer configured for buffer usage during the rendering of the first image. Further, a second memory space in the memory is allocated to a second buffer configured to buffer the first image after the rendering is complete, and a third memory space in the memory is allocated to a third buffer configured to buffer the second image.

In an embodiment, the apparatus is a head wearable device (HWD) worn on a person's head, the display device has a first motion component following the person's head and has a second motion component relative to the person's head. In an example, the prediction system is configured to predict the offset due to the first motion component of the display device. The imaging system is configured to adjust the first image in a same direction of the first motion component according to the offset to generate the second image.

In another example, the prediction system is configured to predict the offset due to the second motion component of the display device. The image system is configured to adjust the first image in a counter direction of the second motion component according to the offset to generate the second image.

Further, the apparatus includes a sensor system configured to generate sensing data in response to the first motion component and the second motion component and provide the sensing data to the prediction system. The sensor system includes a first sensor configured to sense a motion of the person's head; and a second sensor configured to sense a motion of the display device.

In an embodiment, the prediction system includes a first filter configured to filter the sensing data to pass first components that are lower than a threshold and a second filter configured to filter the sensing data to pass second components that are above the threshold. Further, the prediction system includes a first predictor configured to determine the first motion component of the display based on the first components and a second predictor configured to determine the second motion component of the display based on the second components.

According to an aspect of the disclosure, the imaging system is configured to render the first image associated with the first position based on object models, and shift the first image according to the offset to generate the second image associated with the second position.

According to another aspect of the disclosure, imaging system is configured to render, from three-dimensional object models, the first image with corresponding z values associated with the first position, and at least an additional image with corresponding z values associated with a different position other than the first position, and compute the second image associated with second position, based on the first image with corresponding z values and the additional image with corresponding z values.

Aspects of the disclosure provide a method for image displaying, the method includes predicting, for a first time, a first position of a display device at a specific future time for displaying an image associated with a position of the display, rendering a first image associated with the first position, buffering the first image in a memory, predicting, for a second time that is later than the first time, a second position of the display at the future time with an offset to the first position, and adjusting the buffered first image according to the offset to generate a second image associated with the second position of the display device.

The result is that this system reduces the latency that would occur in the image calculations in response to the head motion, by producing an update to the generated images at the last possible time in the creation of a new frame of imagery.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
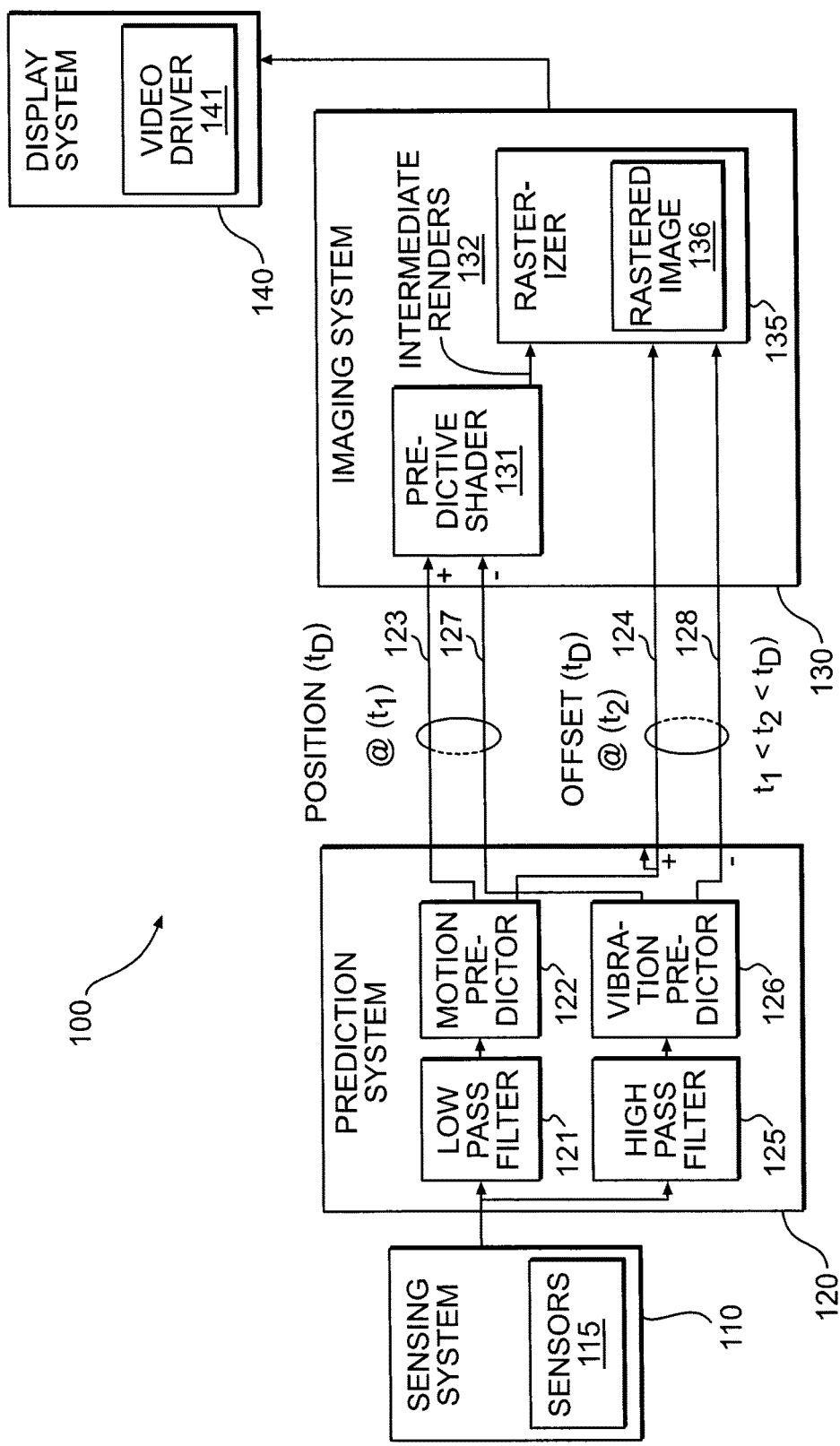
FIG. 1 shows a block diagram of a system example 100 according to an embodiment of the disclosure.

FIG. 1 shows a block diagram of an electronic system example 100 for providing images representing surroundings to a person according to an embodiment of the disclosure. The electronic system 100 includes a plurality of sub-systems, such as a sensing system 110, a prediction system 120, an imaging system 130 and a display system 140. The electronic system 100 is configured to provide a stable image relative to the person, and the image has reduced latency in keeping up with the person's motion.

According to an aspect of the disclosure, the electronic system 100 is embedded in a head wearable device (HWD), such as a helmet, eyeglasses, a visor, and the like, that is worn on a person's head, and provides images representing surroundings to the person.

The display system 140 provides images for the person. The display system 140 can use any suitable display technology, such as a cathode ray tube (CRT) technology, a liquid-crystal display (LCD) technology, a liquid crystal on silicon (LCoS) technology, an organic light-emitting diode (OLED) technology, and the like to provide a screen display that displays images to the person. In the FIG. 1 example, the display system 140 includes a video driver 141. The video driver 141 drives images to the screen display to refresh the screen display at a frame rate, such as 50 Hz and the like.

In an embodiment, the screen display is configured to display only computer-generated images, and thus the electronic system 100 is a virtual reality (VR) system. In another embodiment, the screen display is configured to allow a computer generated image to be superimposed on a real-world view, and thus the electronic system 100 is an augmented reality (AR) system.

The sensing system 110 includes a plurality of sensors, such as micro-electro-mechanical systems (MEMS) motion tracking sensors, and the like, to sense various motion information. In an embodiment, the sensing system 110 includes a first sensor configured to track a head motion of the person and a second sensor configured to track a screen display motion with regard to the person's head. In an example, the person is in an environment with significant noise and vibration, such as in an aircraft cockpit, and the like. Further, the head wearable device is configured to have certain elasticity between the person and the head wearable device. The noise, vibration and the elasticity contribute to a relative motion of the screen display to the person's head.

According to an aspect of the disclosure, the sensing system 110 senses the various motion information and collects sensing data periodically, such as at a frequency of 1 kHz, and the like.

The prediction system 120 is configured to predict a position of the screen display for a specific future time based on motion information sensed by the sensing system 110. According to an aspect of the disclosure, the prediction system 120 predicts the position of the screen display for the same specific future time multiple times. Generally, when the prediction time is closer to the specific future time, the prediction is more accurate. In an embodiment, a refresh cycle of the screen display is about 20 ms corresponding to 50 Hz frame rate. In an example, the prediction system 120 predicts the position of the screen display at the next refreshing time ($t_D$) multiple times before the next refreshing time. For example, at the beginning of a refresh cycle t1, such as 19 ms to $t_D$, the prediction system 120 predicts the position of the screen display at $t_D$ for a first time, and at the end of the refreshing cycle t2, such as 1 ms to $t_D$, the prediction system 120 predicts the position of the screen display for $t_D$ for a second time. Generally, when the time is closer to $t_D$, the envelope of uncertainty is smaller, and thus the second prediction is more accurate than the first prediction. It is noted that the prediction system 120 can provide more than two predictions for the position of the screen display at the specific future time. In an example, a later prediction to the first prediction, such as the second prediction and the like, can be represented as an offset to the first prediction.

Further, according to another aspect of the disclosure, the prediction system 120 is configured to predict the position of the screen display according to various motion modes. In the FIG. 1 example, the prediction system 120 is configured to predict the position of the screen display according to a first motion mode in a low frequency range (e.g., non-periodic motion), and a second motion mode in a high frequency range. The prediction system 120 includes a first prediction processing path and a second prediction processing path to predict the position of the screen display respectively according to the first motion mode and the second motion mode.

The first prediction processing path includes a low pass filter 121 and a motion predictor 122 coupled together, and the second prediction processing path includes a high pass filter 125 and a vibration predictor 126 coupled together as shown in FIG. 1.

In an example, the screen display is worn on the person's head and moves with the person's head, and the first prediction processing path is configured to predict the position of the screen display in response to the person's head motion. To enable the person to view images representing surroundings, the electronic system 100 generates images associated with the position of the screen display, and provides the images to the screen display. Thus, the viewing images by the person are updated in response to the person's head motion. It is noted that, in an example, the electronic system 100 is required to reduce a latency of the images to the head motion to improve user experience.

Generally, the head motion is not periodic or is at a relatively low frequency. For example, the person turns their head in an impulsive manner. In another example, the person is on a rocking boat, and the head position may change due to the external forcing function of the boat. In another example, the person is walking or running, the person may have a head movement of a relatively low frequency. Head motions can be rotational and/or translational, and generally have a motion envelope due to body limitations. The speed of the head motions may decrease as the limits of the head motion envelope are approached. In the FIG. 1 example, the low pass filter 121 extracts the non-periodic and low frequency components from the sensing data provided by the sensing system 110. The non-periodic and low frequency components can be rotational and/or translational. Based on the non-periodic and low frequency components, the person's head position can be predicted.

In an embodiment, the head position can be predicted using a dead-reckoning type of prediction, that is tempered with the human limits of motion, such as using fuzzy-logic-type calculations for speed and extent of predicted motion, as well as a history to help heuristically predict potential head motion, for example.

In an example, person location and head position are sensed at a sampling rate, such as 1 KHz. Based on the person location and the head position at multiple sampling points, the velocity and acceleration for the rotational and translational motions are calculated. Based on the person location and head position and the calculated velocity and acceleration, the position of the screen display at future times can be predicted. For example, as the prediction of velocity and acceleration is made, heuristics can be employed to weight down the predictions depending on how far the person has already turned head to see if the person is in a region of extremity where the prediction may be overstated.

In an embodiment, the motion predictor 122 includes a fuzzy logic system to generate position prediction for a specific future time based on the person's current location, head position, and the calculated velocity and acceleration. In an example, if the head is moving very fast, and it is already partially turned right, then the fuzzy logic system determines that the head will turn moderately fast to the right. The fuzzy logic system defuzzifies to produce a predicted rate of turn and the predicted rate of turn is used to determine the prediction of the orientation of the person's head at the future time. The fuzzy logic system can encode the heuristics that govern the motion of the person's head, perhaps even that of the person head in a given helmet or protective suit that constrains the motion of the head.

Further, in another example, the second prediction processing path is configured to predict an offset of the position of the screen display relative to the person's head. In an example, when the person is in an aircraft cockpit, the screen display in the display system 140 shakes with regard to the person head due to, for example, engine rotation, and the elasticity of the head wearable device. Generally, the shake of the display has higher frequency spectral components than the motion of the pilot's head. In the FIG. 1 example, the high pass filter 125 is configured to extract the high frequency components that correspond to the shake of the screen display. Then the vibration predictor 126 predicts the position of the screen display based on the high frequency components.

In an embodiment, the prediction system 120 uses a filter, such as a digital filter, to extract the high frequency components. In an example, the digital filter uses a fast Fourier transform (FFT) technique. In an example, the prediction system 120 includes a memory device. A portion of the memory device of a constant size is configured as a circular buffer to store the latest time series of the sensing data by the sensing system 110. The latest time series is processed by FFT technique to detect the frequency spectrum of vibration, such as the frequency, phase, and amplitude of high frequency components. In an example, the FFT is conducted in all directions that the vibration is occurring in, including the rotational motion dimensions. In another example, a sparse FFT is used to focus on the top three components for correction, as a practical implementation. The phase and amplitude of the high frequency components are used to determining the motion correction of the image for vibration.

It is noted that, in an example, there is only one sensor in the system 100, and different components of the sensor frequency spectrum are used to perform different corrections, such as the high frequency and the low frequency correction types.

Then, the vibration predictor 126 predicts vibration induced offset. The prediction of the vibration-induced offset can be performed by determining the complex frequency spectrum of the vibration of the screen display, and using the frequency, amplitude, and phase of the main components of the frequency spectrum to extrapolate where the vibrating screen display will be in a given time period, generally one video frame, or 20 msec for example.

The imaging system 130 is configured to generate an image associated with the position of the screen display for the specific future time, and provide the image to the display system 140 to update the screen display at the specific future time. According to an aspect of the disclosure, the imaging system 130 is configured to render the image based on an earlier prediction of the position of the screen display, and is configured to adjust the image based on a later prediction of the position or based on an offset to the earlier prediction.

In an embodiment, the imaging system 130 includes a processing unit, such as a central processing unit (CPU), a graphics processing unit (GPU) and the like, to render the image based on a scene file. In an example, the CPU executes software instructions to render the image based on the scene file. In another example, the GPU processes the scene file to generate the image. The scene file includes objects in a language or data structure. The objects have various attribute information, such as geometry, viewpoint, texture, lighting, shading, and the like for a virtual scene associated with the position of the screen display. The processing unit processes the objects in the scene file and generates a digital image in a suitable format, such as JPG, BMP, and the like or generates raster graphics image file associated with position of the screen display. The image rendering computations are relatively complicated and take a relatively long processing time with respect to the time needed to sample the vibration sensor. The imaging system 130 prepares the scene file based on the earlier prediction, starts the image rendering earlier based on the scene file, and thus allows more time for image rendering.

Further, the imaging system 130 adjusts the image based on later prediction of the position of the screen display, or based on an offset to the previous prediction. In an embodiment, the imaging system 130 does not re-render the image based on the later prediction, but adjusts the pre-rendered image based on the offset for example. The adjustment takes much less time than re-rendering. In an example, the imaging system 130 uses a GPU-based graphic shader configured to perform the adjustment at an accelerated speed.

In the FIG. 1 example, the imaging system 130 includes a predictive shader 131 and a rasterizer 135. The imaging system 130 can operate in potentially simultaneous multiple modes. In an example, the imaging system 130 is in a mode to perform vibration correction. The imaging system 130 renders a rastered image, such as in bitmap, and the like based on an earlier prediction of the position of the screen display. The rastered image is stored in a buffer 136. Then, when a later prediction of the position (or an offset to the earlier prediction) is available, the imaging system 130 performs horizontal and/or vertical shifts on the rastered image according to the later prediction. In an example, the later prediction of the viewing position is provided in the manner of the screen display motion relative to the person's head, the imaging system 130 shifts the image to move in the opposite direction of the screen display. Thus, when the screen display shows the shifted image, the image looks stable to the person.

In another example, the imaging system 130 is in a mode to perform latency correction. The imaging system 130 renders images based on 3D models. Due to person's head motion, the 3D models may have different visibility. For example, a 3D object is visible from one screen display position, however from another viewing position, the 3D object is behind another object and thus is not visible.

In an embodiment, the predictive shader 131 generates intermediate renders based on the earlier prediction. Then, when the later prediction is available, the final image is generated based on the intermediate renders. In an example, the predictive shader 131 renders multiple images with corresponding z values based on the 3D models. The multiple images are respectively associated with different positions of the screen display. Then, when a later prediction of the position (or an offset to the earlier prediction) is available, the imaging system 130 generates the image associated with the later prediction according to the multiple images with corresponding z values. For example, the imaging system 130 performs horizontal and/or vertical shifts on the rastered images and determines visibilities according to the z values.

Then, the adjusted image is provided to the display system 140. In an example, the display system 140 includes a video driver 141. The video driver 141 drives the adjusted image to the screen display to refresh the screen display at time $t_D$.

It is noted that the various sub-systems of the electronic system 100 can be implemented by various technology. In an example, a sub-system is implemented as software instructions executed by a processor. In another example, another sub-system is implemented as integrated circuits.

Figure 2:
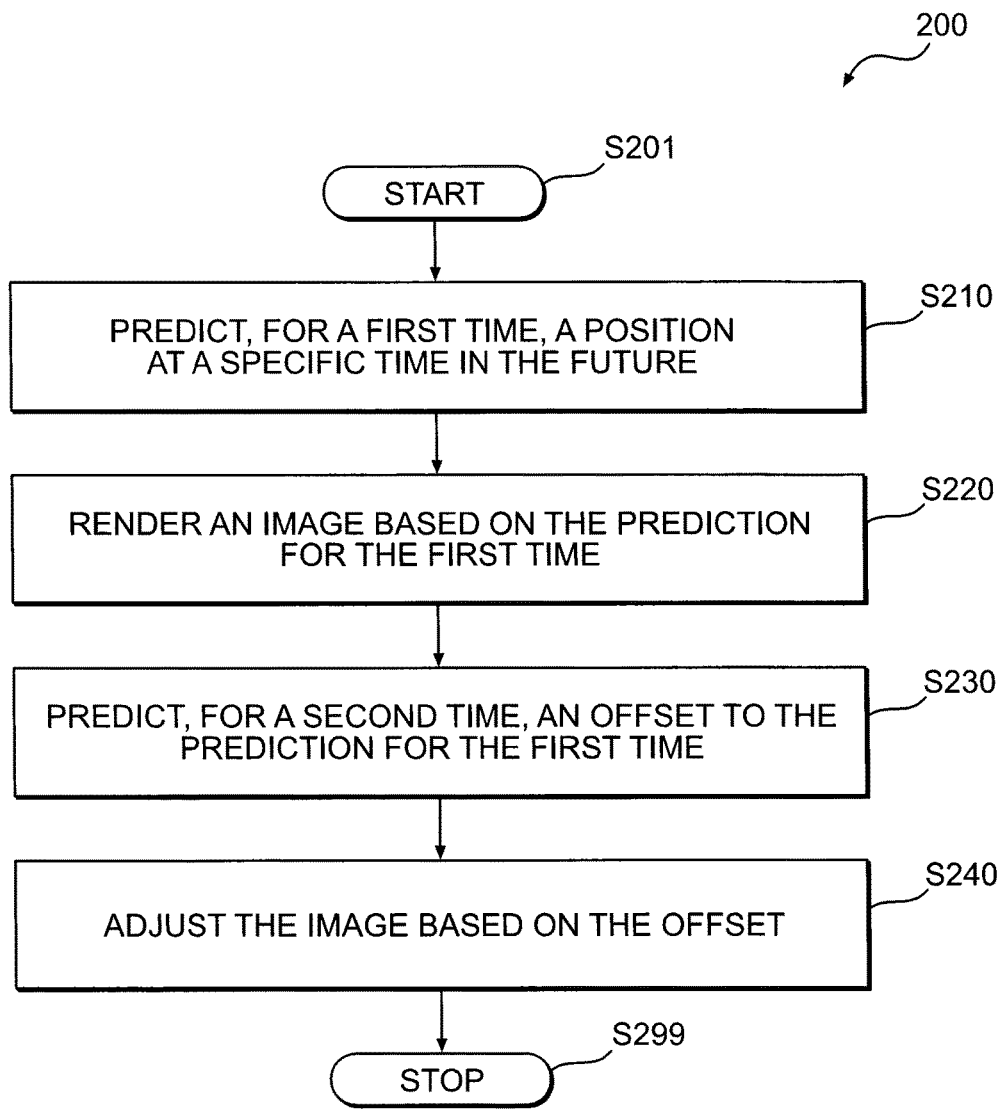
FIG. 2 shows a flow chart outlining a process example 200 according to an embodiment of the disclosure.

FIG. 2 shows a flow chart outlining a process example 200 according to an embodiment of the disclosure. In an example, the process 200 is executed by the electronic system 100. The process starts at S201 and proceeds to S210.

At S210, a position of a screen display at a specific future time is predicted. In the FIG. 1 example, the sensing system 110 collects sensing data at a sampling rate. The sensing data is provided to the prediction system 120. Based on the sensing data, the prediction system 120 predicts a position of a screen display at a specific future time for displaying an image associated with the position of the screen display. In an example, the specific future time is a time for refreshing the screen display. The first prediction happens earlier in a refreshing cycle, before the specific future time.

At S220, a first image associated with the first position is rendered. In the FIG. 1 example, the prediction system 120 provides the first prediction to the imaging system 130. The imaging system 130 renders a computer generated image associated with the first position based on a scene file that includes objects models. In an example, the image is stored in a buffer 136.

At S230, the position of the screen display at the specific future time is predicted for a second time. In the FIG. 1 example, the prediction system 120 predicts the position of the screen display for a second time that is later than the first time. The second prediction is generally more accurate than the first prediction. In an example, the second prediction is represented as an offset to the first prediction.

At S240, the image is adjusted according to an offset to the first prediction. In the FIG. 1 example, the image in the buffer 136 is adjusted according to the offset to the first prediction. The adjusted image is displayed on the screen display at the specific time. Then the process proceeds to S299 and terminates.

Figure 3:
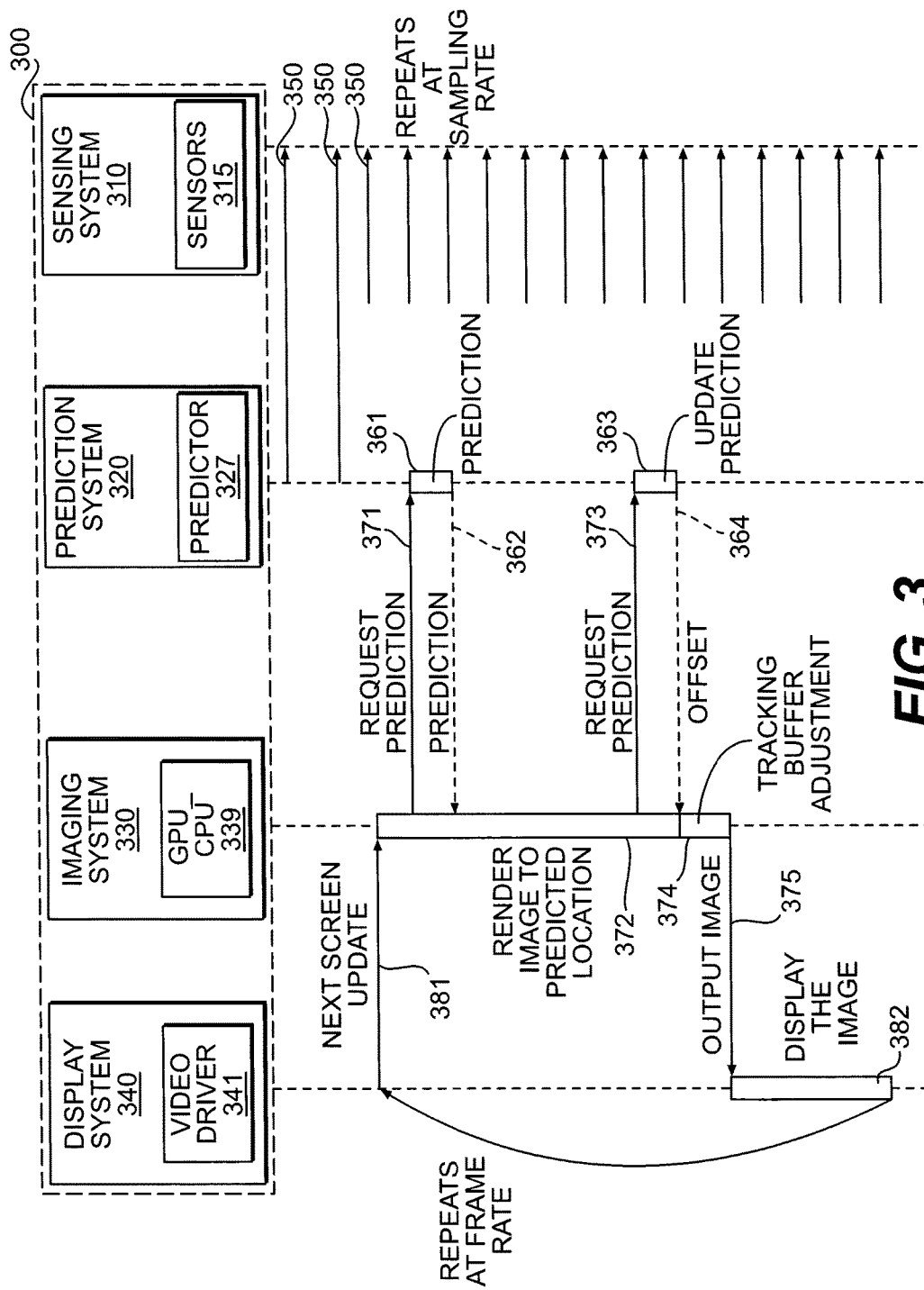
FIG. 3 shows a diagram of processing according to an embodiment of the disclosure.

FIG. 3 shows an operation chart by sub-systems in an electronic system 300 according to an embodiment of the disclosure. Similar to the electronic system 100, the electronic system 300 includes a sensing system 310, a prediction system 320, an imaging system 330 and a display system 340. The sensing system 310 includes various sensors 315. The prediction system 320 includes one or more predictor 327. The imaging system 330 includes one or more CPUs or GPUs 339. The display system 340 includes a video driver 341. In an example, the electronic system 300 is embedded in a head wearable device that is worn on a person's head. The electronic system 300 operates similarly to the electronic system 100 to provide a stable image, and the image has reduced latency in keeping up with the person's motion.

In the FIG. 3 example, during operation, the sensing system 310 is configured to sense motion information, and periodically collect sensing data at a sample rate, such as at over 1 KHz, and the like as shown by 350; and the display system 340 is configured to refresh a screen display with images at a frame rate that is shorter than the motion sensor sampling rate, such as 50 Hz, and the like.

In an example, to prepare image for next screen update, the display system 340 informs the imaging system 330, as shown by 381, that the display system 340 is ready for a next screen update. The imaging system 330 then sends a request, as shown by 371 to the prediction system 320 to request for position prediction. The prediction system 320 conducts a first prediction of the screen display position at the next screen update time based on sensing data, as shown by 361. In an example, the prediction system 320 receives the latest time series of sensing data from the sensing system 310, and predicts the position of the screen display based on the sensing data.

Then, the prediction system 320 provides the first prediction to the imaging system 330 as shown by 362. Based on the first prediction of the screen display position at the next screen update time, the imaging system 330 renders an image associated with the predicted position, as shown by 372. In an example, it takes the imaging system 330 a relatively long time to render the image based on models, such as about ¾ of the available time to process the frame of imagery. In an example, the image is stored in a tracking buffer.

Before the imaging system 330 sends the image to the display system 340, the imaging system 330 sends another request, as shown by 373 to the prediction system 320. The prediction system 320 receives the latest time series of sensing data, and conducts a second prediction of the screen display position at the screen update time based on the latest time series of sensing data, as shown by 363 to update the prediction. Then, the prediction system 320 sends the offset of the second prediction to the first prediction to the imaging system 330.

The imaging system 330 receives the offset, and adjusts the tracking buffer based on the offset, as shown by 374 to generate an adjusted image. In an example, the image adjustment time is much less than image rendering time.

After the adjustment, the imaging system 330 provides the adjusted image to the display system 340, as shown by 375. The display system 340 refreshes the screen display of the adjusted image as shown by 382.

Figure 4:
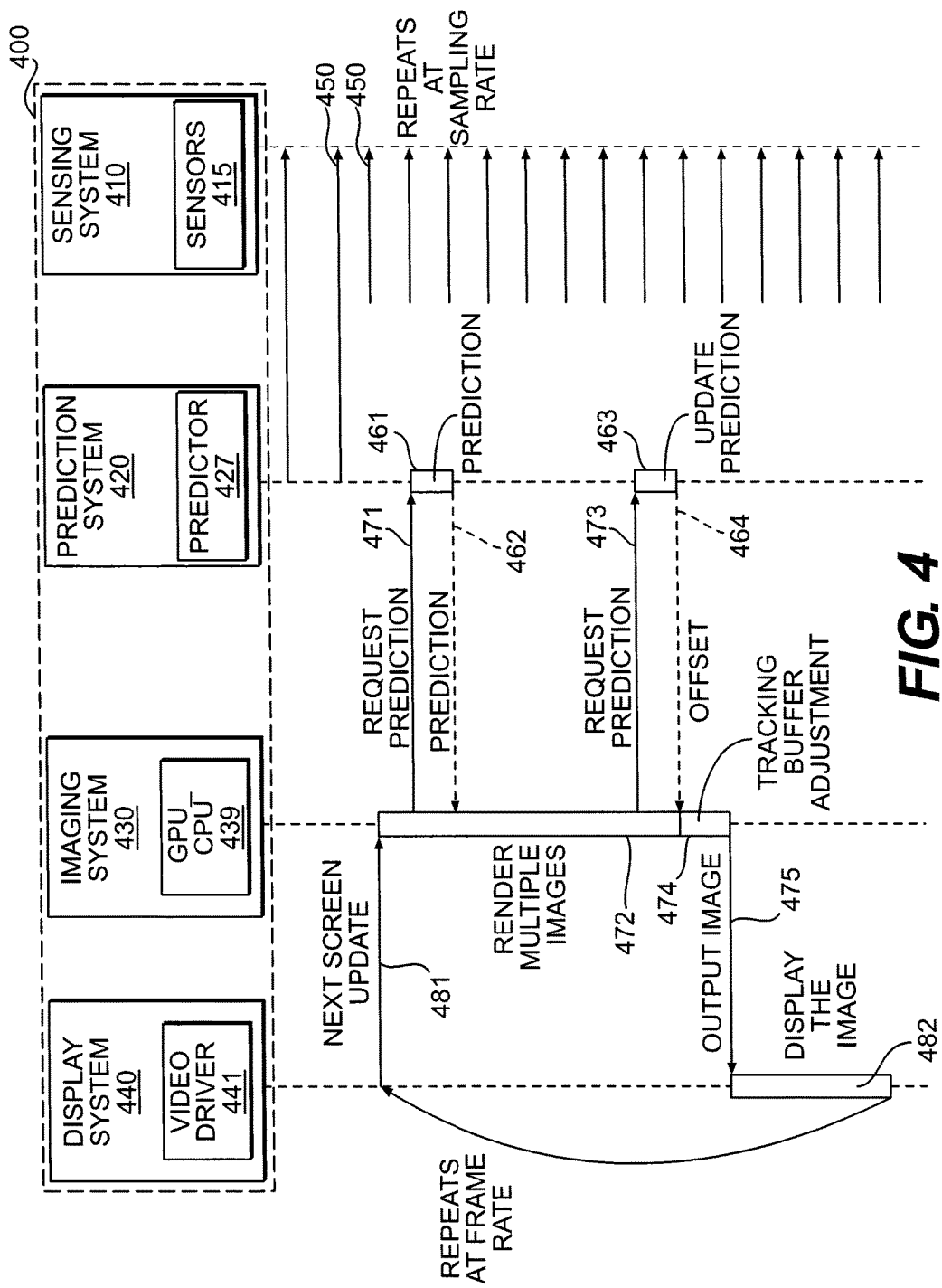
FIG. 4 shows a diagram of processing according to an embodiment of the disclosure.

FIG. 4 shows an operation chart by sub-systems in an electronic system 400 according to an embodiment of the disclosure. The electronic system 400 also utilizes certain components that are identical or equivalent to those used in the electronic system 300; the description of these components has been provided above and will be omitted here for clarity purposes. The electronic system 400 operates similarly to the electronic system 300 described above. However, at 472, the imaging system 430 generates multiple images respectively associated with multiple positions. Further, at 474, the image in the tracking buffer is generated based on the multiple images.

In an embodiment, the images are computer generated images from models of 3D objects. The objects have different visibility from different positions. At 472, for each position, the imaging system 430 generates an image with z-values. In an example, the image is stored in the form of a color buffer associated with a z buffer. For example, a pixel of the image is defined by a color value in the color buffer and a z-value in the z buffer. The multiple positions are different positions. In an example, one position is shifted from another position by a predetermined distance or angle.

At 474, in an example, according to the offset, an image is generated based on the multiple images with associated z values. In an example, when a pixel of the image is generated based on a first image with associated z values, the pixel has a first color value associated with a first z value; and when the pixel of the image is generated based on a second image with associated z values, the pixel has a second color value associated with a second z value. By comparing the first z value and the second z value, the pixel can be finalized. For example, when the z value comparison indicates that the first color is in front of the second color, the pixel is finalized to the first color; and when the z value comparison indicates that the first color is behind the second color, the pixel is finalized to the second color. The finalized image is sent to the display system to refresh the screen display.

Figure 5:
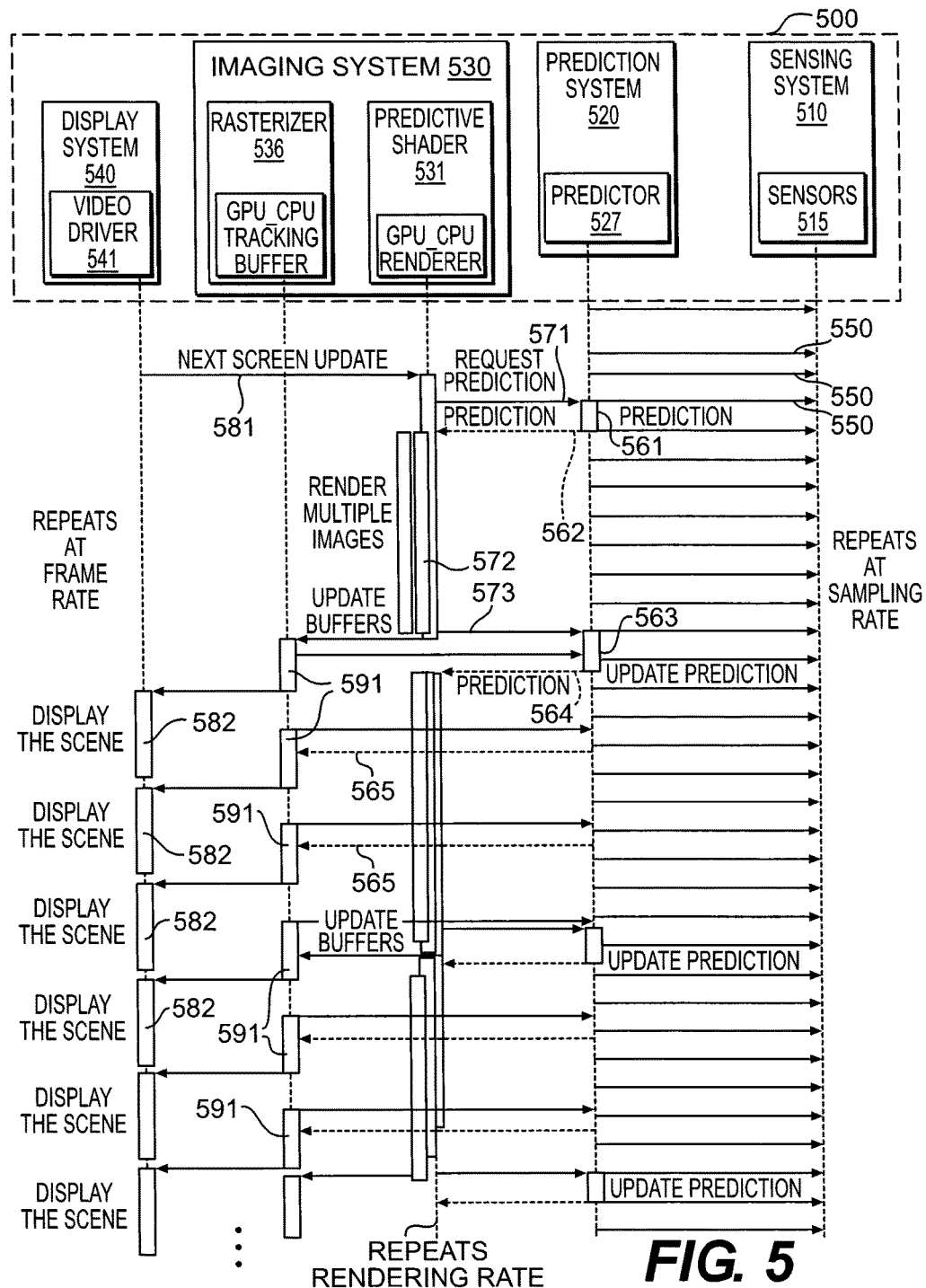
FIG. 5 shows a diagram of processing according to an embodiment of the disclosure.

FIG. 5 shows an operation chart by sub-systems in an electronic system 500 according to an embodiment of the disclosure. The electronic system 500 also utilizes certain components that are identical or equivalent to those used in the electronic systems 100, 300 and 400; the description of these components has been provided above and will be omitted here for clarity purposes. The electronic system 500 operates similarly to the electronic system 400 described above. However, in the FIG. 5 example, the imaging system 530 uses a different rate from the frame rate and the sampling rate, to render images. It is noted that the image rendering does not necessarily have a stable period.

In the FIG. 5 example, the display system 540 includes a video driver 541 configured to receive a complete frame of image and to transfer the image to a physical display device, such as a screen display, through whatever electronic pathways are involved, such as a video graphics array (VGA) cable, a high-definition multimedia interface (HDMI), a parallel RGB (Red Green Blue) electronic binary information transfer mechanism, and the like to cause the screen to refresh at a frame rate that is specified by the manufacturer.

The imaging system 530 includes a predictive shader 531 and a rasterizer 536. In an embodiment, the imaging system 530 is implemented using a CPU and a GPU. The predictive shader 531 then includes a renderer (GPU_CPU renderer) that is partially implemented by the CPU and partially implemented by the GPU. The rasterizer 536 includes a tracking buffer (GPU_CPU tracking buffer) that is partially implemented by the CPU and partially implemented by the GPU. The GPU_CPU tracking buffer is configured to generate the complete frame of image by combining imaging information in intermediate rendered buffers based upon the current known position information returned from the sensing system 510. The GPU_CPU tracking buffer sends complete frames to the imaging system 530 at a stable rate, such as the frame rate.

According to an aspect of the disclosure, the GPU_CPU tracking buffer is implemented in a combination of hardware and software. Specifically, the hardware includes memories and processing units, and the software specifies algorithms to be executed by the processing units to process images buffered in the memories. In an embodiment, a first memory space in the memories is allocated to form a first buffer (also referred to as new buffer), a second memory space in the memories is allocated to form a second buffer (also referred to as current buffer) and a third memory space in the memories is allocated to form a third buffer (also referred to as update buffer). The first buffer is configured for buffer usage during an image rendering process that builds an image from scratch. In an example, the first buffer is dynamically used during the image rendering process, and the end result of the image rendering process for the first buffer includes an image/color buffer and a z-buffer to store image data for a view position. The second buffer is configured to store the latest rendered image after the image rendering is completed. The second buffer includes an image/color buffer and a z-buffer configured to statically store the latest rendered image. The second buffer is updated from the first buffer when a new image rendering is completed in the first buffer. The third buffer is configured for buffer usage during an update process to generate an updated image based on the image in the second buffer. In an example, the update process operates the data in the second buffer according to an offset to the view position to generate a transformed image for a new view position.

It is also noted that, in an embodiment, the first buffer and the second buffer may swap memory spaces. In an example, at a time, GPUs render into the first memory space corresponding to the first buffer. After the rendering is complete, the first buffer and the second buffer swap the memory spaces, thus the first memory space corresponds to the second buffer, and the second memory space corresponds to the first buffer. Then, the second buffer has the data from the first buffer without having to copy all the data from one buffer to the other.

In an embodiment, the position of the screen display in the display system 540 moves in a relatively small degree during the time the next image rendering occurs. In an example, effects of the motion of the screen display are resolved in the rasterizer 536 for simple left-right, and up and down shift. In another example, the effects of the motion of the screen display are resolved by using the color and z-buffers of multiple rendered images to change rotational or positional orientation. This processing occurs repetitively at a stable rate, such as the frame rate, regardless of when new information is provided by the GPU_CPU renderer. This allows the system to maintain a fluid real-time update rate in response to immediate motion by the user's head, while still rendering at a slower rate, or a non-stable rate, if necessary.

According to an aspect of the disclosure, the GPU_CPU renderer is allowed to be more complicated or lower power as it may take a slightly longer time to return results when the GPU_CPU tracking buffer helps to maintain a fluid real-time positional update. In an example, the GPU_CPU renderer can render multiple images respectively associated with slightly displaced or slightly re-oriented views of the person. In the FIG. 5 example, in each image rendering session, multiple images respectively associated with multiple view positions of the person are rendered. Each view includes a set of a color buffer and a z-buffer. These new views are sent to the GPU_CPU tracking buffer when the rendering is complete, and the GPU_CPU tracking buffer uses them for subsequent complete frame calculations.

Further, in the FIG. 5 example, the sensing system 510 includes a plurality of sensors 515. The sensor 515 may be implemented in many different ways, with many different types of interfaces to the prediction system 520. The sensors 515 may be implemented as a single integrated sensor that measures offset in the Cartesian x, y, and z directions as an acceleration that is subsequently be integrated to obtain velocity, and again for position. In an example, the sensors 515 includes a gyroscope to register rotational direction changes, in the three Euler-angle based senses of roll, pitch, and yaw. Even though the gyroscope can be envisioned as returning roll, pitch, and yaw, in a more general form it may return rotation quaternions, having dimensions of s, i, j, and k that serve to establish a rotation axis and the amount of rotation about that axis being performed in the time period. In another example, the sensors 515 are implemented as discrete, separate components. The prediction system 520 integrates and controls all interaction with the sensors 515. It is noted that the interaction with the sensors 515 may occur at a higher repetition rate than the rendering rate of the GPU_CPU renderer or the frame rate of the GPU_CPU tracking buffer. The repetition rate of the sensors 515 interaction is generally stable in order to facilitate the calculations of dynamic physics parameters associated with it, such as velocity, or spectrum components.

In an embodiment, the operation of the electronic system 500, from the initial start to the repetitive, multi-rated, loosely coupled updates, proceeds as follows. It is termed as 'loosely coupled' since the GPU_CPU renderer can complete at any time, not in strict synchrony with any other component in the electronic system 500, and although the sensors 515 have strict sampling rate and the video driver 541 has strict frame rate.

The prediction system 520 receives sensing data at a sampling rate that is a hard real-time fixed rate. It transforms the sensing data as needed and stores the translation and orientation data in internal circular buffers for calculation of dead-reckoning and spectral features, as well as for digital filtering to segment the data into different frequency-range-based types of data, whether impulse-function-type moves or periodic-vibration moves. The prediction system 520 also maintains the current position and orientation of the head wearable device or of the platform upon which the sensors 515 are mounted, to be queried by the GPU_CPU tracking buffer at the image-adjustment-before-output stage 591.

At an initial start 581, it is time to generate an image for the screen display. The GPU_CPU renderer sends a request 571 for a prediction of the location and orientation of the view point at a time in the future when the render processing is likely to be completed. The prediction system 520 combines all predictive mechanisms to produce a predictive result 561 that sends the predictive result to the GPU_CPU renderer. The GPU_CPU renderer renders the predicted image. The GPU_CPU renderer may calculate multiple images, a hyper-render so to speak, so that motion in any direction that may occur during the rendering process may be corrected in the GPU_CPU tracking buffer. When the GPU_CPU renderer has completed all its processing, GPU_CPU renderer sends color and z-buffers to the GPU_CPU tracking buffer for adjustment. After the GPU_CPU renderer has completed its current rendering, the GPU_CPU renderer requests a new prediction of views from the prediction system 520, and prepares for the next rendering. In an example, the GPU_CPU renderer interacts with the display system 540. When a next frame cycle starts, the display system 540 signals the GPU_CPU renderer to start the next rendering. Then the GPU_CPU renderer sends a request 571 to request from the prediction system 520 a prediction of the location and orientation, for example, of the view position for the next frame.

In an example, the GPU_CPU renderer continues on in this manner until the display is turned off. The duration of the rendering that is used may be an average duration of the rendering as detected during the online processing. The GPU_CPU renderer can also call for a new prediction before the rendering is complete, thus performing parallel pipelining of the processing and further reducing latency.

After the first set of rendered buffers (color buffers and z-buffers) are sent to the GPU_CPU tracking buffer, the GPU_CPU tracking buffer requests the sensing system 510 through the prediction system 520 to determine the most current location and orientation of the camera scene (e.g., screen display position) from which to adjust the image in the GPU_CPU tracking buffer so that the image presents the most real-world-physical-motion-correlated correct locational and orientation-situated rendition of the scene to the user through the display.

In the embodiment that the GPU_CPU tracking buffer is implemented to include the first buffer, the second buffer and the third buffer, the first buffer is used by the GPU_CPU renderer during the rendering process and the end result is a color-buffer and a z-buffer. In an example, the color-buffer stores pixel color for each pixel in two-dimensional (e.g., X and Y), and the z buffer stores a third dimension (e.g., Z) information for each pixel. The end result is then stored in the second buffer. When the GPU_CPU tracking buffer receives an offset, the third buffer is updated based on the second buffer according to the offset. In an example, a pixel in the third buffer is determined by a single pixel or fragment transform operation from the second buffer according to the offset. In another example, a pixel in the third buffer is determined by pixel or fragment transform operation from two color-buffers at different view positions and their corresponding z-buffers according to the offset. It is noted that any suitable algorithm can be used for the pixel or fragment transform operation.

After GPU_CPU tracking buffer updated the third buffer based on the second buffer according to the offset, the GPU_CPU tracking buffer outputs the image in the third buffer to the display system 540 to display the image, as shown by 582. In an embodiment, each time the GPU_CPU tracking buffer updates the image in the third buffer, GPU_CPU tracking buffer gets the newest location from the prediction system 520, from which GPU_CPU tracking buffer updates the third buffer based on the second buffer according to the new location. After a new rendering in the first buffer is done, based upon the latest prediction that was performed before the start of this render, the end result in the first buffer is transmitted to the second buffer in the GPU_CPU tracking buffer and the GPU_CPU tracking buffer uses the new image in the second buffer for subsequent periodic adjustments of the third buffer and video displays. This entire process continues all the while that real-time motion-correlated image is being produced.

In one embodiment, at least two images are generated, possessing x,y screen positions and z-dimension distance into the screen. These x,y,z coordinates may be contained in the GPU fragment stage or in a later screen rendered stage, such as that as would be needed for 3D stereo imagery. In the 3D imagery case, there would be a left eye and a right eye image generated. In ordinary usage, once the final image is created, the z-buffer information would have already have been used and no longer needed, but in this case there will now be two or more images created and existing in GPU memory at the same time, and each pixel of these images would have z-buffer information associated with it. These buffers can be called the hyperfragment buffers, since they contain z-dimension information, as in an ordinary fragment in a GPU, but also because the combination of them provides more information than can be seen from the eyepoint at one location, requiring the use of another dimension or set of dimensions, related to the new viewpoint location, to see more of the imagery. Each image also has been created with a certain eye-point, or virtual-camera position, associated with it. It is this virtual camera position that may change during the rendering operation time of the GPU.

At the start of rendering, a prediction of the virtual-camera position is requested 571 from the motion predictor 520 and the hyperfragment images are rendered to correspond to that prediction. This position estimation supplies the expected locations and orientations of all virtual cameras for which an image is being rendered. The rendering 572 of these multiple images is performed, and then the prediction system 520 is again queried 573 for final location and orientation of the head. If the head has moved with respect to the previously computed location and orientation that had been rendered, then the Rasterizer system 536 can adjust what geometry is visible from the new eyepoint at that moment using pixels from different hyperfragment buffers to fill in around the edges. This is the concept of the tracking buffer, where it is built from other (hyper)fragment buffers based upon tracking the motion of the user. It provides the ability to see around object edges to show imagery that would have previously been hidden. The final imagery for one eyepoint will be calculated and presented to the user. This may all be duplicated for the other eye, as needed, and the calculated multiple hyperfragment images may be shared between eyes for use in this final tracking-buffer rendering process.

The multiple images could also be created as a single hyperfragment buffer possessing more rendering that performed around the occultation area of each object further back in the scene. This means that around the edges of each object, where it is occulted (not able to be seen since the other object is in front of) by another object closer to the eyepoint, that extra fragments will be generated for use by the tracking buffer in adjusting the image for the final sensed head position and orientation in a frame.

The imagery in each hyperfragment buffer consisting of a set of x,y screen-space locations, and a z component indicating the distance into the screen, represent a 3D point-cloud. They have a distinct location in the virtual environment also. The point cloud of one camera would have information that describes further back imagery than another could see, because it is viewing the scene from a different location. The most dramatic occurrence of the ability to see around an object would take place when there is a nearby object, and head motion would otherwise cause erroneous imagery to be displayed, without the use of the tracking buffer.

Figure 6:
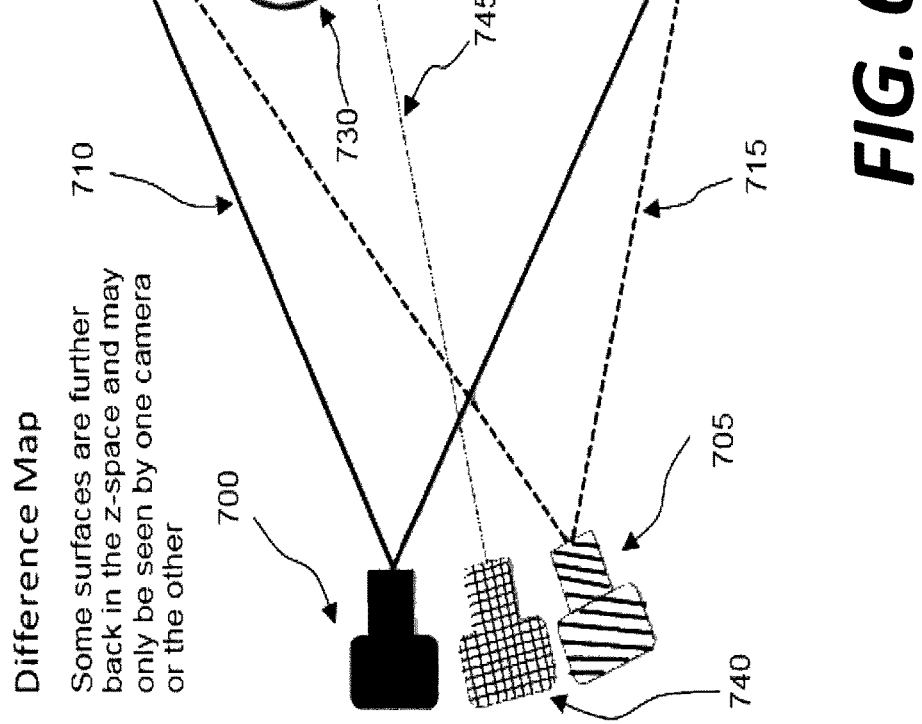
FIG. 6 shows a diagram that uses multiple virtual cameras (view positions) to allow the imagery behind the frontmost imagery to be visible according to an embodiment of the disclosure.

In FIG. 6, the solid-color virtual camera 700 is at a different virtual location than the striped-color virtual camera 725. Thus camera 700 has a viewing frustrum 710 that is different than the viewing frustrum 715 of camera 705. This being so, the objects in the virtual environment will be occulted differently in the view in each camera. For instance, the back wall 720 is not viewable, and hence not rendered, for the striped camera's 705 view. It is occulted by the round object 730 that it is front of it in the scene. Similarly, the solid camera 700 cannot view the wall 725 behind the round object 730 in this scene due to the position of the solid camera. The information for the otherwise-occulted areas is contained in the combination of fragments in the hyperfragment buffers. These buffers could also be viewed as a set of x, y, z buffers that cover more screen space than one viewing camera could see at a time. Then as the head is measured 573 to have moved to a new position 740 during the rendering process 572, it is possible for the tracking buffer to make a more complete image by querying the hyperfragment buffers for the best information they have for each ray traced out a pixel of the viewport, such as would be seen as the ray 745 that intersects the rear surface at 750 in FIG. 6. Each pixel in the final rendered scene gets the most accurate color information that is available from all the hyperfragment buffers, being that of the fragment that is furthest back in the z dimension from the combination of buffers for a given interpolated viewpoint.

After the z-buffer based tracking buffer image is available, then the vibration-based portion of the tracking buffer is applied using the latest position from the prediction subsystem, although it is less of a prediction at this time in the frame as it is an actual location. The image from the z-buffer-based image creation system is larger, has more pixels than, the image that needs to be sent to the display system. There is a sub-image inside the z-buffer image result. The vibration-based adjustment is used to select the sub-image to provide the anti-motion adjustment, and the resulting sub-image is sent for display to the display system 540. The use of multiple virtual cameras allows the imagery behind the frontmost imagery to be seen correctly as the user's head moves during a frame.

Through the use of multiple simultaneous rendered views of the image from multiple viewpoints, the final image may be constructed using the most accurate virtual object rendered colors from multiple buffers rendered at different locations and orientations.

Two types of motion correction are performed, the head-motion correction using the multiple z-buffer-based correction system, and the display-vibration correction using the FFT-based or final-position-based correction mechanisms.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus for image displaying, comprising:
 a prediction system configured to predict, by a fuzzy logic system, according to different motion modes, for a first time, a first position of a display device at a specific future time for displaying an image associated with a position of the display device, and predict, for a second time that is later than the first time, a second position of the display device at the specific future time with an offset to the first position, the different motion modes including at least a first motion mode and a second motion mode, the first motion mode used to predict the position of the display device in non-periodic motions or low frequency motions, the second motion mode used to predict the position of the display device in high frequency motions, wherein the fuzzy logic system predicts that a head of the apparatus' user in a protective suit, which constraints a motion of the head, will turn to a first direction at a first speed when the head is moving at a second speed that is faster than the first speed and the head is already partially turned to the first direction, the first speed being used to predict the second position; and an imaging system configured to render a first image associated with the first position, buffer the first image in a memory, during the first motion mode of operation, adjust the buffered first image in a same direction of motions of the display device according to the offset to generate a second image associated with the second position, and during the second motion mode of operation, adjust the buffered first image in a counter direction of motions of the display device according to the offset to generate the second image.

2. The apparatus of claim 1, wherein the apparatus is a head wearable device (HWD) worn on a person's head, the display device has a first motion component following the person's head and has a second motion component relative to the person's head.

3. The apparatus of claim 2, wherein:
the prediction system is configured to predict the offset due to the first motion component of the display device; and
the imaging system is configured to adjust the first image in a same direction of the first motion component according to the offset to generate the second image.

4. The apparatus of claim 2, wherein
the prediction system is configured to predict the offset due to the second motion component of the display device; and
the image system is configured to adjust the first image in a counter direction of the second motion component according to the offset to generate the second image.

5. The apparatus of claim 2, further comprising:
a sensor system configured to generate sensing data in response to the first motion component and the second motion component and provide the sensing data to the prediction system.

6. The apparatus of claim 5, wherein the prediction system comprises:
a first filter configured to filter the sensing data to pass first components that are lower than a threshold; and
a second filter configured to filter the sensing data to pass second components that are above the threshold.

7. The apparatus of claim 6, wherein the prediction system comprises:
a first predictor configured to determine the first motion component of the display device based on the first components; and
a second predictor configured to determine the second motion component of the display device based on the second components.

8. The apparatus of claim 1, wherein the imaging system is configured to render the first image associated with the first position based on object models, and shift the first image according to the offset to generate the second image associated with the second position.

9. The apparatus of claim 1, wherein the imaging system is configured to render, from three-dimensional object models, the first image with corresponding z values associated with the first position, and at least an additional image with corresponding z values associated with a different position other than the first position, and computer the second image associated with second position, based on the first image with corresponding z values and the additional image with corresponding z values.

10. The apparatus of claim 1, wherein the imaging system includes a graphics processing unit (GPU) configured to adjust the first image buffered in the memory based on the offset to generate the second image.

11. The apparatus of claim 1, wherein a first memory space in the memory is allocated to a first buffer configured for use during the rendering of the first image, a second memory space in the memory is allocated to a second buffer configured to buffer the first image after the rendering is complete, and a third memory space in the memory is allocated to a third buffer configured to buffer the second image.

12. A method for image displaying, comprising:
predicting according to different motion modes, for a first time, a first position of a display device at a specific future time for displaying an image associated with a position of the display device;
rendering a first image associated with the first position;
buffering the first image in a memory;
predicting, by a fuzzy logic system, according to the different motion modes, for a second time that is later than the first time, a second position of the display device at the specific future time with an offset to the first position, wherein the different motion modes including at least a first motion mode and a second motion mode, the first motion mode used to predict the position of the display device in non-periodic motions or low frequency motions, the second motion mode used to predict the position of the display device in high frequency motions, wherein the fuzzy logic system predicts that a head of the apparatus user in a protective suit, which constraints a motion of the head, will turn to a first direction at a first speed when the head is moving at a second speed that is faster than the first speed and the head is already partially turned to the first direction, the first speed being used to predict the second position;
during the first motion mode of operation, adjusting the buffered first image in a same direction of motions of the display device according to the offset to generate a second image associated with the second position; and
during the second motion mode of operation, adjusting the buffered first image in a counter direction of motions of the display device according to the offset to generate the second image.

13. The method of claim 12, further comprising:
mounting a head wearable device (HWD) with the display device a person's head, the display device having a first motion component following the person's head and having a second motion component relative to the person's head.

14. The method of claim 13, wherein predicting, the second time that is later than the first time, the second position of the display device at the future time with the offset to the first position and adjusting the first image according to the offset to generate the second image associated with the second position of the display device further comprises:
  predicting the offset due to the first motion component of the display device; and
  adjusting the first image in a same direction of the first motion component according to the offset to generate the second image.

15. The method of claim 13, wherein predicting, the second time that is later than the first time, the second position of the display device at the future time with the offset to the first position and adjusting the first image according to the offset to generate the second image associated with the second position of the display device further comprises:
  predicting the offset due to the second motion component of the display device; and
  adjusting the first image in a counter direction of the second motion component according to the offset to generate the second image.

16. The method of claim 13, further comprising:
  generating sensing data in response to the first motion component and the second motion component.

17. The method of claim 16, further comprising:
  filtering the sensing data to pass first components that are lower than a threshold; and
  filtering the sensing data to pass second components that are above the threshold.

18. The method of claim 17, further comprising:
  determining the first motion component of the display device based on the first components; and
  determining the second motion component of the display device based on the second components.

19. The method of claim 12, further comprising:
  rendering the first image associated with the first position based on object models; and
  shifting first image according to the offset to generate the second image associated with the second position.

20. The method of claim 12, further comprising:
  rendering, from three-dimensional object models, the first image with corresponding z values associated with the first position;
  rendering, from the three-dimensional object models, at least an additional image with corresponding z values associated with a different position other than the first position; and
  computing the second image associated with second position, based on the first image with corresponding z values and the additional image with corresponding z values.

21. The method of claim 20, wherein computing the second image associated with the second position, based on the first image with corresponding z values and the additional image with corresponding z values further comprises:
  determining a color at a pixel of the second image from the first image and the additional image according to the corresponding z values at the pixel.

22. The method of claim 12, further comprising:
  storing data corresponding to pixel information of the first image in a buffer; and
  processing, the data corresponding to pixel information of the first image, based on the offset to generate the second image.

23. The method of claim 12, further comprising:
  allocating a first memory space in the memory for buffering usage during the rendering of the first image;
  allocating a second memory space in the memory to buffer the first image after the rendering is complete; and
  allocating a third memory space in the memory to buffer the second image.

* * * * *